June 18, 1963
A. ZARCHIN
3,093,975
PROCESSES FOR SWEETENING SALTWATER BY FREEZING
Filed Feb. 17, 1960
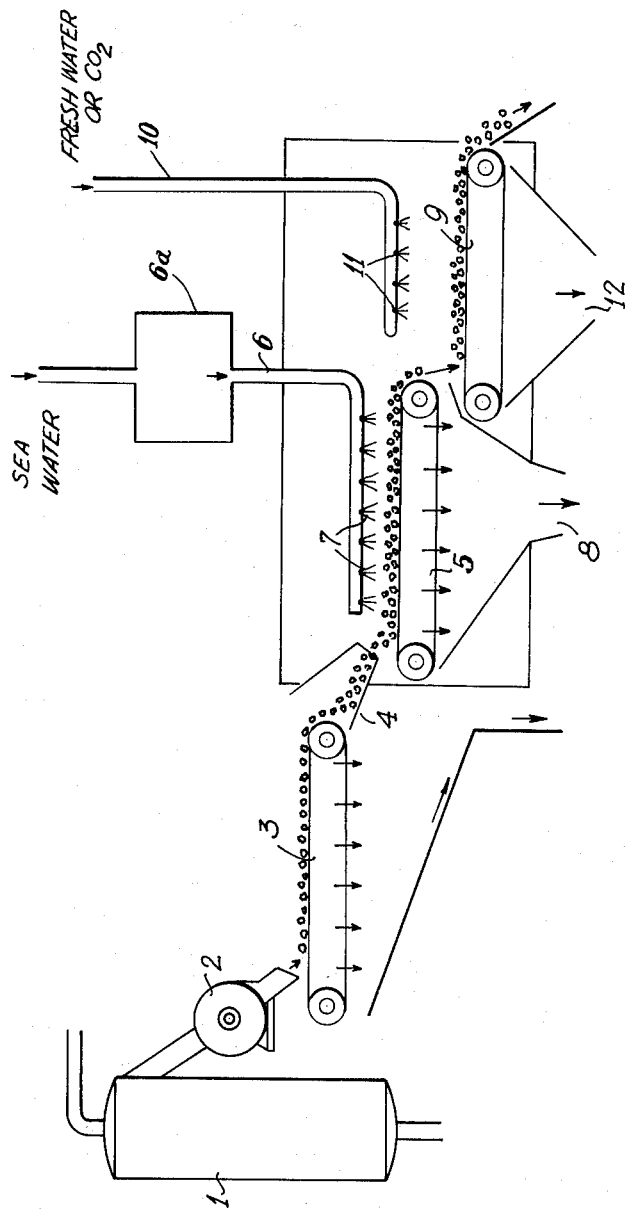
INVENTOR.
Alexander Zarchin
BY J.T. Basseches
his attorney

3,093,975
PROCESSES FOR SWEETENING SALTWATER BY FREEZING
Alexander Zarchin, 26 Syrkin St., Tel Aviv, Israel
Filed Feb. 17, 1960, Ser. No. 9,288
5 Claims. (Cl. 62—58)

Whenever water is to be sweetened by means of freezing, there is obtained a mixture of ice-crystals and brine. This brine is enriched with the salts previously contained in the whole quantity of water and it has to be removed from the ice-crystals to which it clings before these are melted and converted into sweetened water.

The ice-crystals contained in the brine are separated therefrom by any known means and thus there are obtained ice-crystals which are contaminated on their surface by a film of adhering brine.

In known processes for sweetening seawater or other salt solutions this removal of the adhering brine is carried out by rinsing the ice-crystals with either water vapor, liquid carbon dioxide or, as mostly suggested, by means of precooled sweet water.

All these steps suffer from considerable drawbacks. The cleaning by means of water vapors is not easily accomplished and loss of considerable quantities of the previously frozen ice-crystals is apt to occur.

As regards the removal of said surface film by rinsing with sweet water, it has to be pointed out that, if sufficient quantities of water are used for removing the brine adhering to the crystals, there is at the same time, a considerable part of the ice-crystals themselves dissolved and melted, resulting in a considerably decreased yield of the process.

It is an object of the present invention to improve the known processes for sweetening sea water, (or any other salt-or brackish water, the notion "sea water" comprising these solutions).

It is more particularly an object of this invention to simplify the known processes and to reduce the cost thereof.

It is a further object of the invention to provide a step in a sweetening process which can be applied to any water sweetening process where freezing is resorted to.

The present invention is based on the discovery that the film of brine adhering to the ice-crystals may be removed by rinsing the said ice-crystals with precooled, unsweetened water, which may be part of a batch, the remainder of which batch is subsequently frozen during the course of the sweetening process. Consequently the ice-crystals will be enveloped in a film of unsweetened water, which, however, has a much smaller salt content than the brine which had been washed off.

Thus it is possible to obtain the ice-crystals with a surface film of unsweetened water instead of brine, and for many purposes the water therefrom obtained is sufficiently sweet. If it is desired to obtain still purer water, it is possible to resort, after this initial cleaning step, to one or more of the previously mentioned known steps, resulting eventually in considerably smaller losses due to said known steps.

According to a preferred embodiment of the invention, the cleaning of the ice-crystals from the adhering film of brine is carried out by means of previously precooled, unsweetened water of such temperature that the losses due to melting of the ice-crystals themselves is minimized.

Sea water starts freezing at a temperature of about $-1.9°$ C., there being obtained crystals of substantially pure ice, contaminated by a film of adhering concentrated brine. According to the invention part of the sea water due to be frozen and sweetened is precooled to about $-1°$ C., which does not yet bring about its freezing, and part of the said precooled water at this temperature is used for removing the film of brine from the ice-crystals, the major part of the sea water, i.e. the part not used for removing the the film of brine, being thereafter frozen. Thus the film of brine is removed and replaced by a film of ordinary sea water, without bringing about the melting of any of the ice-crystals, as same do not melt at a temperature below $0°$ C. This represents a considerable progress in the technique of sweetening sea water by freezing, as the film of concentrated brine is removed and replaced by a film consisting of water with much lower salt contents. The eventual salt contents, after melting of the crystals is so low that the water thus obtained may be used for certain industrial and agricultural purposes.

The invention will now be described with reference to the annexed diagrammatical drawing, it being understood that the invention is not limited to any specific sweetening process by freezing but may be applied to any process where the sea water is frozen with the intention of melting the ice to obtain sweet water. Such processes are described in full in my U.S. Patent No. 2,821,304, in my co-pending U.S. application Ser. No. 614,751 and in my British Patent No. 806,727.

Sea water partially frozen in any known manner, is pumped from a container 1 by means of a pump 2 (or is delivered by gravity) onto a moving sieve or screener 3. The partially frozen sea water is a mixture of the ice-crystals and concentrated brine. While being carried on the sieve 3, which is a perforated conveyor band, the brine drips down through the perforations of the band and the crystals are delivered over a chute 4 onto a second conveyor 5. The brine thus separated from the crystals is led off into a waste container, or back into the sea, or into a heat exchanger to utilize the cold of the now cooled brine, e.g. for cooling a new batch of water from the sea. The ice crystals now on conveyor 5 are covered, as is known, with a film of brine of the same salt contents as the brine previously separated from the crystals on sieve 3. In another stage of the plant the sea water to be sweetened has already been cooled down to $-1°$ C. prior to freezing as by cooler 6a. Now part of this water is led through a conduit 6 to a number of nozzles or shower heads 7 which are positioned on top of the conveyor 5 so that the ice-crystals are exposed to a spray from these nozzles and are thus thoroughly rinsed with cold sea water, which means that the film of high salt contents adhering to the crystals is eventually replaced by another film of much lower salt contents. The conveyor 5 is preferably situated in a closed chamber so that the ice-crystals are not exposed to normal outside temperature which might cause their melting while being rinsed. The water used for rinsing is salt-enriched and is led off at 8 and is piped or led into the freezing plant. The ice-crystals may, at this stage, already be melted for use since the adhering film of normal sea water will cause a rather mild salinity only so that the water is practically already in this stage usable for irrigating certain crops and for some industrial purposes. Where absolutely sweet and practically salt-free water is required, the ice-crystals, after the said rinsing with sea water, may be subjected to a further rinsing with fresh water in a known manner, or with $CO_2$ as described in my U.S. Patent No. 2,821,304. This can be done on a further conveyor 9, preferably also enclosed in a chamber for the reasons set out above.

Under such circumstances the rinsing agent may be introduced through a conduit 10 to a number of nozzles or shower heads 11 which are positioned adjacent the conveyor 9 so that the ice crystals on conveyor 9 are thoroughly rinsed. The residue may be led off at 12. Where $CO_2$ is used, as is taught in my aforesaid patent, the conveyor 9 is preferably enclosed to permit reuse of the $CO_2$.

It should be understood that the invention resides in the step of rinsing the crystals with precooled sea water, and that this rinsing may be followed by a further rinsing, or not, with any means for removal of the sea water adhering to the crystals.

I claim:

1. In a process of sweetening sea water by means of freezing comprising partially freezing the sea water to obtain a mixture of ice-crystals and concentrated brine, separating the ice-crystals from the brine, the step of rinsing the separated ice-crystals with sea water of about $-1°$ C. while permitting said rinse to drain clear of the crystals, so as to remove the brine adhering to the crystals, and thereafter melting the crystals to obtain fresh water.

2. The process according to claim 1, wherein the separated, rinsed ice-crystals, before melting, are rinsed again with fresh water.

3. The process according ot claim 1, wherein the separated, rinsed ice-crystals, before melting, are rinsed again with $CO_2$ under pressure of 36 atm. at least.

4. The process of sweetening sea water which comprises the steps of partially freezing said sea water to obtain a mixture of ice crystals and concentrated brine, draining said mixture, and rinsing the remaining ice crystals with sea water at about $-1°$ C. while said crystals are supported on a draining surface.

5. The process in accordance with claim 4 wherein the rinsed crystals are rinsed again with fresh water.

References Cited in the file of this patent

UNITED STATES PATENTS

| | | |
|---|---|---|
| 2,315,762 | Ax et al. | Apr. 6, 1943 |
| 2,780,281 | Reinert | Feb. 5, 1957 |
| 2,821,304 | Zarchin | Jan. 28, 1958 |
| 2,904,511 | Donath | Sept. 15, 1959 |
| 3,012,409 | Ashley | Dec. 12, 1961 |

FOREIGN PATENTS

| | | |
|---|---|---|
| 102,539 | Sweden | Sept. 14, 1941 |
| 70,507 | Norway | June 3, 1946 |

OTHER REFERENCES

Gilliand: "Fresh Water for the Future," Industrial and Engineering Chemistry, volume 47, No. 12, December 1955, pages 2410–2422.